June 12, 1923.
A. F. WALLBILLICH
1,458,451
RECORDING APPARATUS FOR VEHICLES
Filed May 16, 1918   3 sheets-sheet 1
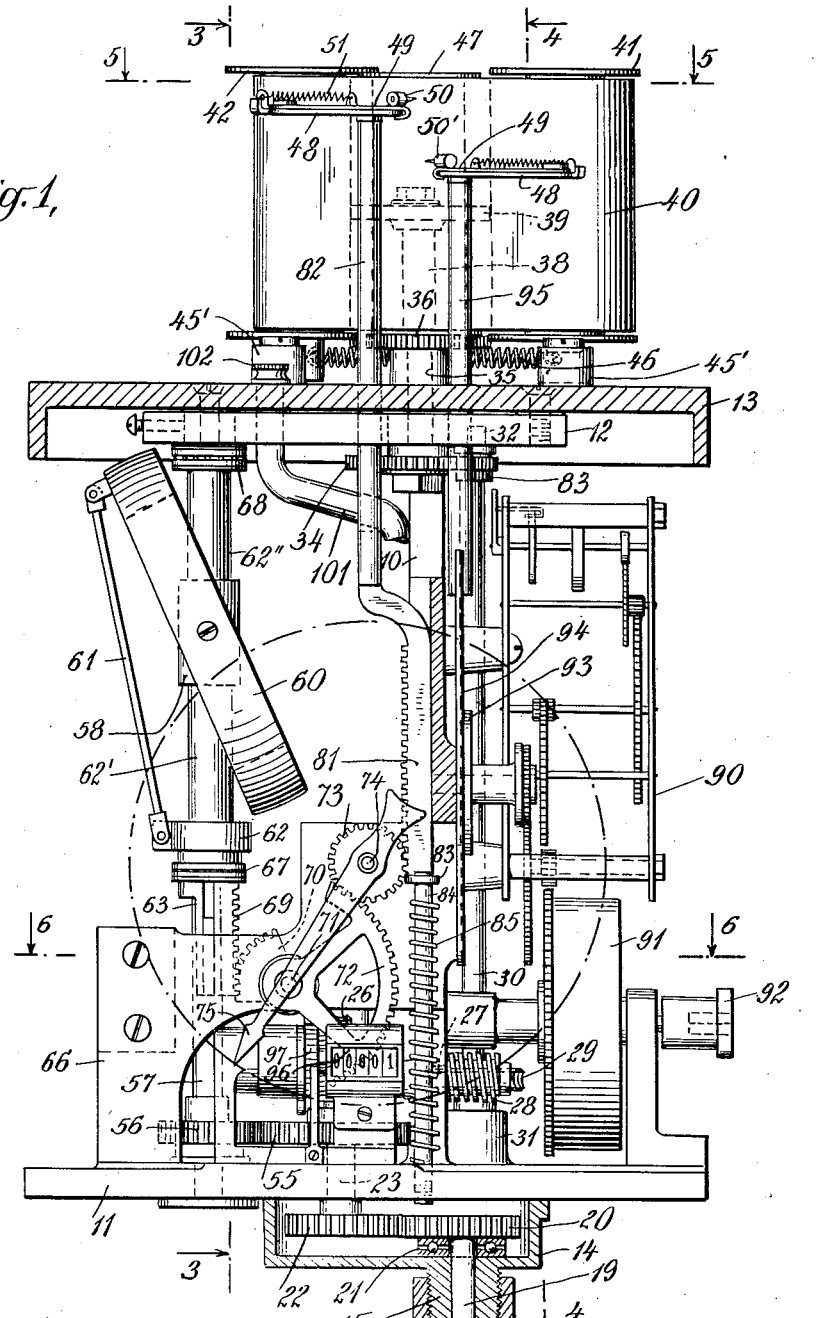
Fig. 1.

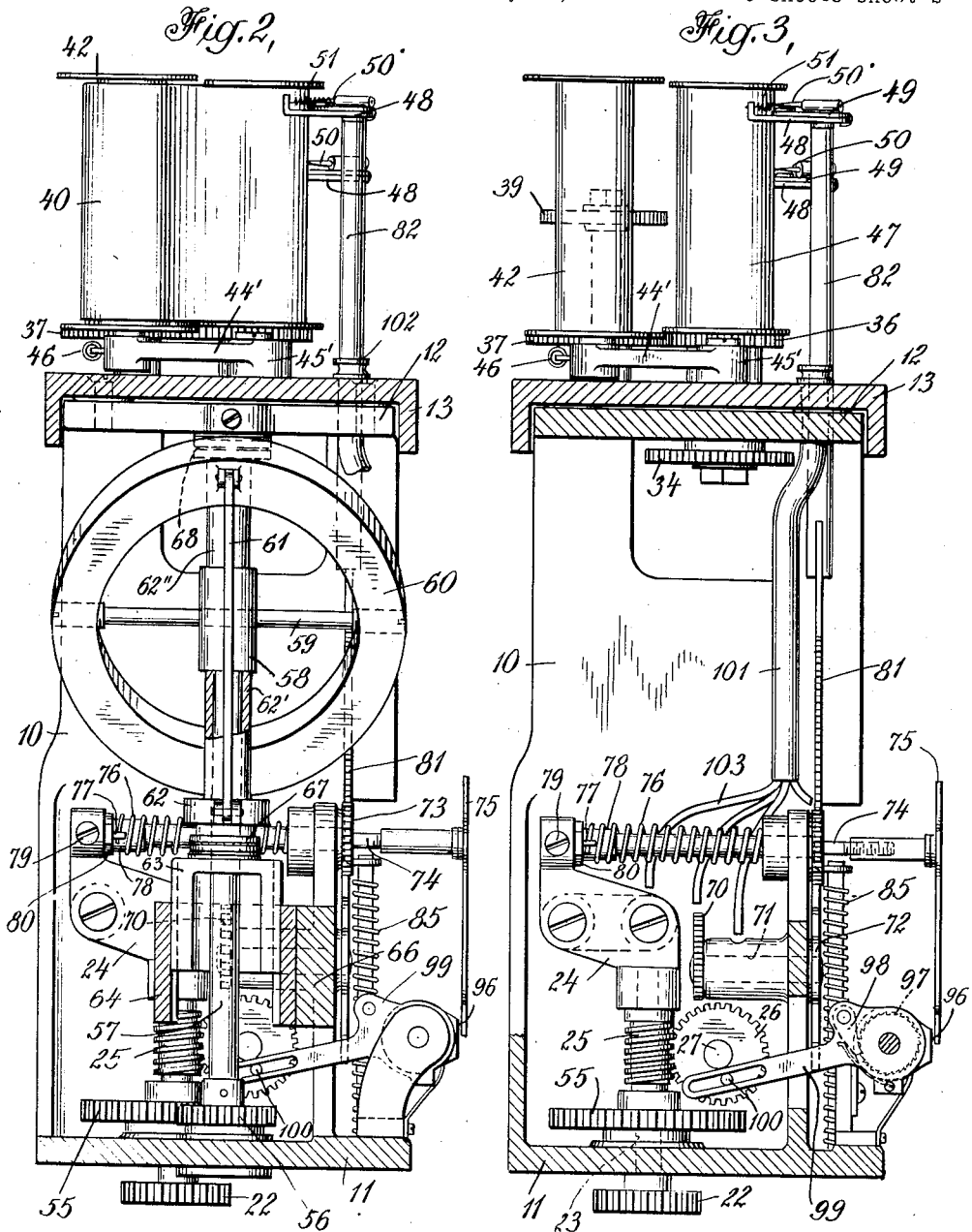

June 12, 1923.
A. F. WALLBILLICH
1,458,451
RECORDING APPARATUS FOR VEHICLES
Filed May 16, 1918  3 sheets-sheet 3
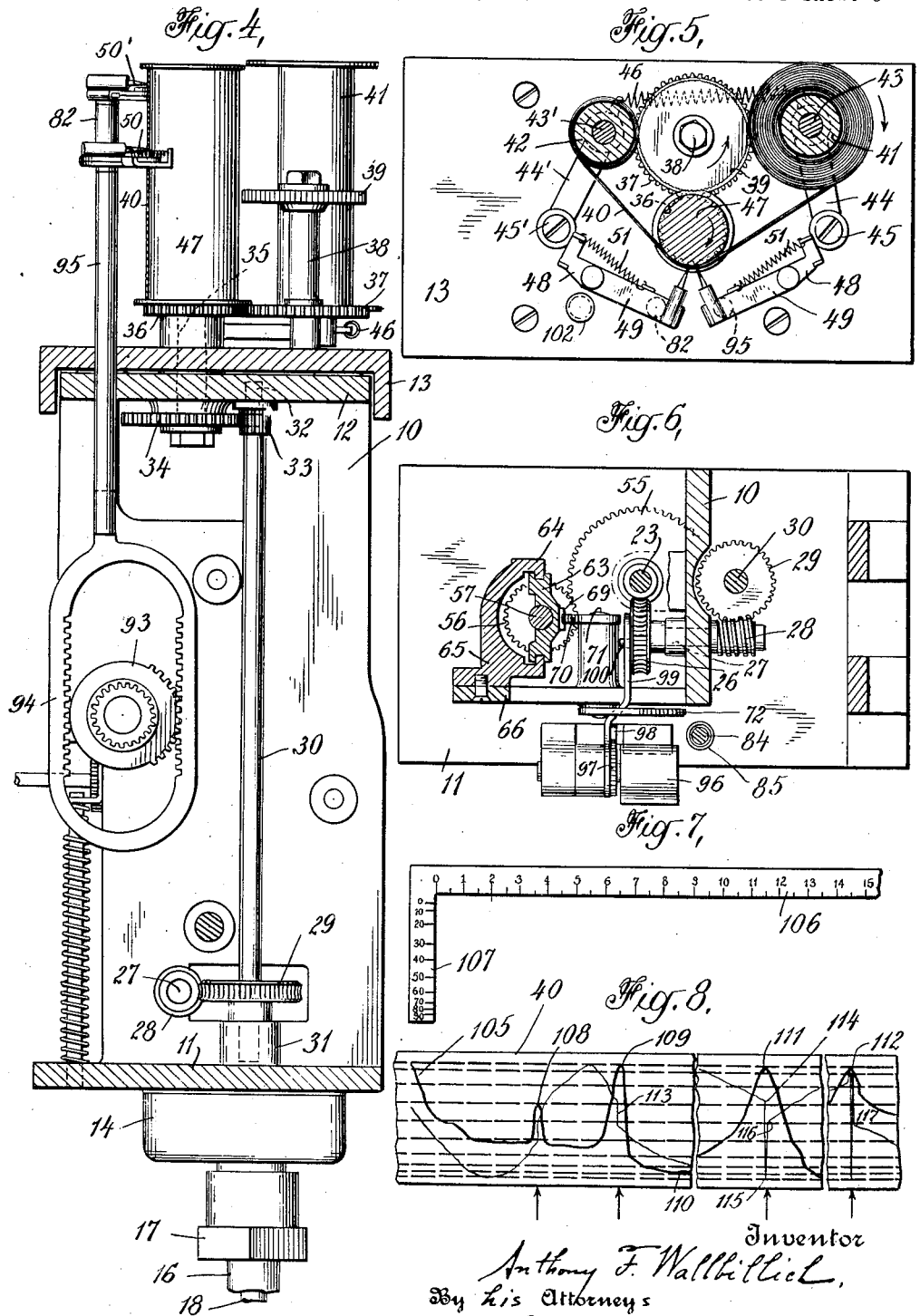

Patented June 12, 1923.

1,458,451

UNITED STATES PATENT OFFICE.

ANTHONY F. WALLBILLICH, OF NEWARK, NEW JERSEY.

RECORDING APPARATUS FOR VEHICLES.

Application filed May 16, 1918. Serial No. 234,869.

*To all whom it may concern:*

Be it known that I, ANTHONY F. WALLBILLICH, a citizen of the United States, residing at Newark, in the county of Essex, State of New Jersey, have invented certain new and useful Improvements in Recording Apparatus for Vehicles; and I do hereby declare the following to be a full, clear, and exact description of the invention, such as will enable others skilled in the art to which it appertains to make and use the same.

The present invention which relates to recording apparatus for vehicles involves an instrument for automatically producing a continuous record of the action of a vehicle, such as a locomotive or car that is intended to travel over a fixed route, so that its speed and other characteristics of travel over the route may be accurately recorded for future reference.

Recording apparatus for vehicles has heretofore been proposed and constructed in which a recording tape has been driven at uniform speed by clock mechanism, and a marker actuated from the wheel of the vehicle is adapted to trace upon the tape a curve the shape of which indicates the speed of the vehicle at all times throughout the period of use of the instrument. Such recording apparatus has been supplemented by a second recording device comprising a centrifugal member actuated from the wheel of the vehicle in proportion to the speed of the latter and operating an index adapted to move over a suitable scale. The centrifugal member also operates a second marker which traces a record upon the tape corresponding to the indications of the index. This record is more direct in its readings than is the record made by the first marker, and while serving as a check upon the latter is independent of the same to the extent that its accuracy is not dependent upon the accuracy of the clock mechanism that drives the tape. Apparatus of the character described above, while adapted to give a record of the speed of a vehicle at all times, cannot be conveniently used for determining the speed of a vehicle at given points on its route of travel without computations based on the indicated speed, the rate of travel of the tape and the known distances between the points.

The present invention aims to overcome the disadvantages of recording apparatus of the type referred to above by providing an instrument in which one of the components of the recorded indications shall depend directly upon the distance traveled by the vehicle, so that by comparing the record produced by the instrument with a suitable scale or key chart representing the route traversed by the vehicle, the action of the latter at any point on the route may be quickly determined. The invention further provides mechanism for producing a record, within certain limits, of the length of time that the vehicle is not in motion at any particular point. Since it may frequently happen that a vehicle, such for instance as a switching engine, may move back and forth within a limited space for a considerable period of time, and such movements would with the apparatus of the present invention, produce a record, the characteristics of which cannot be clearly distinguished, the invention provides means for taking into account such movements of a vehicle.

Briefly described, the above objects, as well as others that will hereinafter appear, are attained by an instrument in which the recording tape is moved in proportion to the distance traversed by the vehicle, and a centrifugal governor controlling a marker is adapted to produce a continuous record of the speed of the vehicle, so that when the recording tape is removed from the apparatus and compared with a corresponding key chart on which the various stations, stops, slow-down points and other places at which it may be desired to determine whether the driver of the vehicle was obeying orders may be quickly determined. In connection with the centrifugal recording device the apparatus is provided with a marker actuated by clock-work to move back and forth across the tape during a predetermined time, so that from the characteristics of the record produced by this marker the length of time during which the vehicle is not in motion at any particular point of its route may be accurately determined. It will be understood that since the tape is moved in proportion to the travel of the vehicle, and the marker actuated by the centrifugal device is inoperative if the vehicle is at rest, that without the provision of some means, such as the time actuated marker, the record given by the instrument would be incomplete in so far as stops of the vehicle are concerned. In order to provide for the contingency of operation where the vehicle travels back and forth within a limited space and thus might produce on the recording tape confused indications, the apparatus includes a registering device actuated by the vehicle to record each unit of distance over which it passes.

The particular nature of the invention will appear more clearly from a description of a preferred embodiment thereof as shown in the accompanying drawings in which Fig. 1 is a front view of the interior mechanism of the instrument; Fig. 2 is a side view of the same; Fig. 3 is a view in section along the line 3—3 of Fig. 1; Fig. 4 is a view in section along the line 4—4 of Fig. 1; Fig. 5 is a horizontal section along the line 5—5 of Fig. 1; Fig. 6 is a horizontal section along the line 6—6 of Fig. 1; Fig. 7 shows a key chart or scale for use in reading the record tape of the apparatus, and Fig. 8 is a view of portions of the tape with records thereon.

Referring to the drawings in which similar reference characters denote similar parts throughout the several views, the standard upon which the parts of the instrument are mounted comprises a vertical portion 10 having horizontal base and top portions 11 and 12 respectively. Upon the top portion 12 is a cover member 13 upon which is mounted the mechanism of the recording tape as will hereinafter appear. It is intended that the instrument shall be surrounded by a suitable casing, which since it forms no part of the operating mechanism of the instrument has not been shown. In practice, the mechanism of the recording tape mounted on the cover plate of the instrument will be provided with a suitable casing preferably sealed or locked against unauthorized removal to prevent tampering with the record.

Attached to the base portion 11 is a housing 14 provided with a depending portion 15, to the lower end of which is attached a protecting sleeve 16 by means of a union 17. The sleeve may be of any desired length and serves to enclose a flexible shaft 18 leading to any suitable part of the vehicle from which it may be driven in any convenient manner. The shaft may be of any preferred construction to give it flexibility, and its upper end is attached to a shaft 19 passing through the depending portion 15 of the housing and carrying at its upper end a gear 20. The weight of this gear as well as of shafts 18 and 19 is borne by a ball bearing 21 within the housing 14. Gear 20 meshes with a gear 22 on the lower end of a main driving shaft 23 extending through the base 11 and guided at its upper end by a bearing in a bracket 24 attached to the supporting members of the instrument. The shaft 23 is provided with a worm 25 which engages a pinion 26 on the end of a shaft 27 mounted in suitable bearings in the vertical portion 10 of the support as shown most clearly in Fig. 6. The shaft 27 is provided with a worm 28 engaging a pinion 29 near the lower end of a vertical shaft 30 mounted in bearings 31 and 32 respectively at the base and top of the instrument. At the upper end of shaft 30 is a pinion 33 which engages a gear 34 mounted on the lower end of a shaft 35 which extends through a suitable bearing at the top of the instrument and carries at its upper end a gear 36 which engages a gear 37 on a vertical shaft 38. A knurled disk 39 is attached to the upper end of shaft 38 and as shown most clearly in Fig. 5, this disk is adapted to engage the surface of a recording tape 40 to unwind it from a reel 41 and wind it upon a reel 42 or vice versa according to the direction of travel of the vehicle. The reel 41 is mounted upon a spindle 43 attached to the free end of an arm 44 pivoted at 45 to the top of the apparatus, and the reel 42 is mounted upon a similar spindle 43′ attached to the free end of a second arm 44′ pivoted at 45′. A spring 46 connected between the free ends of the arms holds both rolls of tape against the disk 39, so that movement of the latter unwinds the paper from reel 41 and winds it upon reel 42, or unwinds it from reel 42 and winds it upon reel 41 according to the direction of travel of the vehicle. The paper during its travel passes over a roller 47 which forms a bearing surface for the markers. Each of the markers comprises an arm 48 adapted to be attached to the end of certain actuating rods as will hereinafter appear. Each arm 48 has pivoted thereto an arm 49 provided at its free end with a socket for the reception of marking pencils 50 or 50′. A spring 51 attached to the movable and fixed arms holds the pencil against the recording tape.

The main shaft 23 carries a gear 55 which engages a gear 56 attached to the lower end of a vertical shaft 57 mounted in suitable bearings at the bottom and top of the instrument. The shaft 57 is formed with an enlarged portion 58 to which is attached by means of arms 59 a centrifugal member 60. A link 61 connects one edge of the centrifugal member to a collar 62 clamped or otherwise attached to the lower end of a sleeve 62′ slidably and rotatably mounted on shaft 57. Another sleeve 63 is slidably mounted upon shaft 57 but is prevented from turning thereon by guides 64 formed on a bracket 65 attached to a portion 66 of the supporting frame. A ball bearing 67 should preferably be interposed between the lower end of sleeve 62′ and the upper end of sleeve 63. A sleeve 62″ surrounds shaft 57 above the portion 58 and at its upper end carries one ring of a ball bearing 68, the other ring of which is attached to the under side of the top portion 12. This ball bearing receives the upward thrust exerted upon the shaft 57 as will appear more clearly hereinafter.

The sleeve 63 is provided with a rack 69 engaging a segmental gear 70 on a stub-shaft 71 mounted in a suitable bearing projecting from the inner face of the supporting portion 66. A second segmental gear 72 is attached to the front end of shaft 71 and engages a pinion 73 on a shaft 74 to which is attached a pointer 75 adapted to move over a suitable scale, which is provided on the front of the instrument, but which for simplicity is simply indicated by a broken line circle in Fig. 1. Surrounding the shaft 74 is a spring 76, the forward end of which is attached in any suitable manner to the shaft, while the other end is attached as at 77 to a socket 78 which serves as a bearing for the corresponding end of shaft 74, and which may itself be rotated and clamped in any desired position of adjustment by means of a set screw 79. The socket 78 is preferably provided with a nut portion 80 to facilitate the adjustment of the socket and consequent alterations in the torsion effect of spring 76, which it will be understood exerts its force through the pinion 73 and gears 72 and 70 to hold the sleeve 63 against the lower end of sleeve 62', thereby resisting the tendency of the centrifugal member to displace both of these sleeves. The force exerted by this spring will also act through the sleeves and against the enlarged portion 58 of the shaft tending to lift the latter, and it is to receive this upward thrust and reduce friction that ball bearing 68 is provided. The pinion 73 engages a rack bar 81 provided at its upper end with a rod 82 which extends through the top of the instrument casing and carries at its upper end the marking pencil 50. The lower end of rack bar 81 is provided with an offset portion 83 adapted to slide over a rod 84 extending upward from the base of the instrument. A spring 85 surrounds the rod 84, but is not engaged by the offset portion 83 until the latter has been depressed a certain amount by the action of the centrifugal member. The purpose of the spring 85 is thus to reinforce the spring 76 in resisting the turning movement of the centrifugal member as the speed of the vehicle increases, and by suitable proportioning of the effects of the springs 76 and 85, the centrifugal member may be accurately calibrated in terms of the speed of the vehicle.

Attached to one side of the central supporting member 10 of the instrument is a clock mechanism 90 driven by a main spring 91 which may be wound by a suitable key inserted in a socket 92 removably attached to the shaft of the main spring. As shown most clearly in Fig. 4, the clock mechanism drives a pinion 93 provided over a portion only of its periphery with teeth which alternately engage a double rack bar 94 to oscillate the same, and through the rod 95 attached to the upper end of the rack bar actuate the marking pencil 50' which is attached to the upper end of this rod.

Mounted upon a suitable bracket at the front of the instrument is a registering device 96 which may be of any suitable construction and is provided with an operating ratchet 97 and pawl 98, the latter being attached to and actuated by a pivoted arm 99 which at its inner end is formed with a slot for the reception of a pin 100, projecting from the face of pinion 26, the arrangement being such that one rotation of this pinion will move the first dial of the registering device forward one step. For the purpose of oiling the various bearings and gears of the instrument, an oil feed tube 101 is attached at its upper end to the cover plate 13 and closed by a cap 102. From the lower end of the tube a number of branch tubes 103 lead to the bearings or gears that should be lubricated.

In the operation of the instrument described above, the main shaft 23 is driven from the wheel of the vehicle through the flexible shaft 18, shaft 19 and gears 20 and 22. Through the worm 25, pinion 26, shaft 27, worm 28, pinion 29 and rod 30, the disk 39 will be actuated to cause the record tape 40 to be fed in one direction or the other according to the direction of travel of the vehicle. The gears will be so proportioned to each other and related to the wheel of the vehicle from which they are driven that for every unit of distance traversed by the vehicle, the tape will be moved a certain distance which in practice will be short enough to permit a tape to be used for recording the entire distance covered by the vehicle, and yet will not exceed the limits of space available for the tape. In Fig. 8 there is shown a section of the recording tape and the horizontal dashes represent each unit of distance traversed by the vehicle. It will be understood that instead of breaking the lines to represent the units of distance that suitable ordinates may be used to divide the tape into units. At the same time that the record tape is being moved by the travel of the vehicle the centrifugal member 60 will be actuated from the main shaft 23 through gears 55, 56 and shaft 57, and this member will be so constructed, and its opposing springs 76 and 85 will be so proportioned that the pointer 75 will indicate on the scale of the instrument the speed of the vehicle. At the same time the marking pencil attached to the end of rod 82 which is actuated through the rack bar 81 will move over the tape in proportion to the speed of the vehicle, with the result that when the vehicle is in motion there will be traced upon the tape a permanent record, the vertical component of which is proportional to the speed of the vehicle, while the horizontal component represents the distance traversed by the vehicle. Such a curve is represented in Fig. 8 by the heavy line 105. It may be explained at this point that for convenience in reading the tape a suitable scale or key chart as shown in Figure 7 may be used. The horizontal arm 106 of this scale is provided with graduations corresponding to the units of distance on the tape and preferably numbered consecutively. The vertical arm 107 of the scale has graduations corresponding to the speed of the vehicle as indicated by the position of the marking pencil actuated by the centrifugal member. When the vehicle is at rest, this pencil is near the upper edge of the tape so that the scale reads downward. The graduations may be unequally spaced, due to the varying effect of the centrifugal member and the springs which control the same, but they correctly indicate the speed of the vehicle corresponding to any given displacement of the centrifugal member. By comparing the tape with the scale, the speed of the vehicle at any point of its travel may be accurately determined, and if the instrument is applied to a locomotive or car adapted to pass over a fixed route, stations and other points along the route may be designated on the scale. In the representation of the chart shown in Fig. 8, the point 108 shows where the speed was reduced and then increased, which may have been in accordance with instructions to the engineer, and a comparison of the point at which this speed reduction occurred will show at once if it occurred at the designated point on the route. Point 109 indicates a stop of the vehicle, after which the speed was rapidly increased until it reached nearly its possible maximum as indicated by the portion 110 of the curve. At the point 111 there was another stop, and one also at the point 112. These stops may have been at stations or other stopping points on the line, but if upon comparison with the key chart, it is found that any of them occur at points where no stop has been ordered, the reason for the stoppage of the vehicle can be investigated.

Since in any case the stoppage of the vehicle causes the recording tape to stop moving, the speed curve described above does not give an indication of the length of time during which the vehicle was standing. It is for this purpose that the marker actuated by clock mechanism is provided, it being intended that this marker shall make an excursion over the tape in a predetermined time. When the vehicle is standing, the time controlled marker will trace a vertical line on the tape as at the point 113 in Figure 8. By determining the length of the vertical portion of the curve produced by this marker in comparison with the known time required for the marker to move from one edge of the tape to the other, the length of time during which the vehicle was standing may be accurately determined. If for instance it be assumed that the marker moves across the tape in 10 minutes, the vertical portion 113 will indicate a stop of about two minutes since this vertical portion is substantially one-fifth of the total distance travelled by the marker across the tape. At the point 111 it will be noted that the vertical portion of the curve traced by the time controlled marker starts at the point 114, goes to the edge of the tape as at 115 and returns to the point 116 before the vehicle again resumes its motion as indicated by the sloping portion of the curve. The distance traversed by the marker from the point 114 through the point 115 to the point 116 in comparison with the distance traversed by the marker across the tape in the predetermined time interval, will show the length of stop at the point 111, which in the present case amounts to about 12 minutes. For clearness of illustration, the vertical portions of the curve traced by the time controlled marker have been slightly separated, but in practice they will coincide. The slope of the curve after the vehicle resumes its movement as compared with the slope before it stopped will show whether or not the marker is continuing across the tape in the same direction.

At the point 112, the time controlled marker has made two passages across the tape and has reached the point 117 in its third passage. Precisely as in the case of the other stops, the length of time during which the vehicle is standing can be at once determined, and the general slope of the curve as the vehicle resumes movement will show at once that the marker is on its third passage across the tape. It should also be noted that since the tape is moved forward in proportion to the distance travelled by the vehicle, and the second marker is time controlled, the slope of the curve traced by this second marker, is proportional to the speed of the vehicle at different points, so that from the slope of this curve at any particular point on the route, an indication of the speed of the vehicle may be determined. While this record may not be read as directly as can the speed curve produced by the marker actuated by the centrifugal device, it nevertheless serves as a check upon the latter record to show whether or not the centrifugal device is in proper adjustment, or to detect tampering with this device.

Since it may happen that a vehicle to which the recording instrument of the present invention is applied may move back and forth within a comparatively short distance for a considerable period of time, as for instance in the case of an engine used for switching cars in a railroad yard, the markers would produce curves upon the recording tape which would lie so close together, or might even overlap that it would be difficult to determine the actual distance traversed by the vehicle. It is for this purpose that the registering device 96 has been provided. As has been explained above, this registering device is intended to totalize the distances traversed by the vehicle in opposite directions, so that if the vehicle is travelling back and forth over a portion of the route, which might lie within one of the unit divisions on the recording tape, the indications given by the register will show the distance actually travelled by the vehicle during its service.

In practice the entire instrument including the record tape will be surrounded by a sealed or locked casing so that the operator of the vehicle cannot obtain access to the interior of the instrument to alter the adjustment of the parts or falsify the recorded indications. The operator by observing the indications given by pointer 75 on its scale can at once tell the speed of the vehicle, but since the recording pencil attached to rod 82 is directly actuated from the same mechanism as is the pointer any subsequent statements by the operator regarding the indications given by the pointer can be verified from the record on the tape.

I claim:

1. In recording apparatus for vehicles, a shaft operatively connected to a moving part of the vehicle, a record tape, actuating connections between said shaft and said tape for driving the latter in unison with the vehicle, a centrifugal device operatively connected to said shaft, a marker operatively connected to said centrifugal device for producing on said surface a record of the speed of the vehicle, a second marker, an actuating rod therefor provided with parallel racks, a clock mechanism and a mutilated pinion driven thereby and adapted to engage said racks alternately to cause the second marker to oscillate periodically over the tape.

2. In recording apparatus for vehicles, a record surface, means for moving said surface in unison with the travel of the vehicle, a centrifugal device actuated in accordance with the speed of the vehicle, a shaft, an indicator on the shaft, operating connections between said centrifugal member and said shaft, a torsion spring surrounding said shaft and having one end connected thereto and adapted to oppose movement of said centrifugal member, an adjustable retaining device for the other end of said spring whereby the torsion effect of said spring may be altered, a reciprocating rod, means for actuating said rod from said shaft, a marker attached to said rod and adapted to coact with said surface to produce thereon a record of the speed of the vehicle, and a spring adapted to be brought into operative relation with said rod after a predetermined movement of said rod to reinforce the effect of said torsion spring in opposing movement of said centrifugal member as the speed of the vehicle increases.

3. In a recording device for vehicles, a record tape, means to drive said tape in unison with the vehicle, a marker, clock mechanism to drive said marker whereby to give the latter a periodic traverse of said tape, a centrifugal device actuated in accordance with the vehicle speed, a shaft, an indicator mounted on said shaft, operative connections between said shaft and said centrifugal device whereby to cause said indicator to provide an instantaneous speed reading, a rod adapted to be actuated by said shaft, a marker on said rod to co-act with said tape to produce a speed record thereon, a spring opposing the movement of said shaft from its position of rest and a spring disposed on said rod and reinforcing the action of said first-named spring after said shaft movement has reached a predetermined value.

In testimony whereof I affix my signature.

ANTHONY F. WALLBILLICH.